(12) United States Patent
Stahr et al.

(10) Patent No.: US 9,745,938 B2
(45) Date of Patent: Aug. 29, 2017

(54) INJECTOR SYSTEM

(75) Inventors: Wolf Stahr, Abstatt (DE); Martin Haug, Weil der Stadt (DE); Horst Kirschner, Brackenheim-Hausen (DE); Frank Miller, Ilsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 556 days.

(21) Appl. No.: 13/996,690

(22) PCT Filed: Nov. 4, 2011

(86) PCT No.: PCT/EP2011/069419
§ 371 (c)(1),
(2), (4) Date: Sep. 10, 2013

(87) PCT Pub. No.: WO2012/084323
PCT Pub. Date: Jun. 28, 2012

(65) Prior Publication Data
US 2013/0340713 A1    Dec. 26, 2013

(30) Foreign Application Priority Data
Dec. 23, 2010    (DE) .................. 10 2010 064 115

(51) Int. Cl.
*F02M 69/46*    (2006.01)
*F02M 21/02*    (2006.01)
(Continued)

(52) U.S. Cl.
CPC ...... *F02M 69/465* (2013.01); *F02M 21/0245* (2013.01); *F02M 21/0278* (2013.01);
(Continued)

(58) Field of Classification Search
CPC .. F02M 69/465; F02M 69/50; F02M 21/0281; F02M 21/0278; F02M 55/025;
(Continued)

(56) References Cited

U.S. PATENT DOCUMENTS 4,290,394 A * 9/1981 Frank .................... F02B 61/045
                                                      123/472
5,074,269 A * 12/1991 Herbon ................ F02M 55/004
                                                      123/456
(Continued)

FOREIGN PATENT DOCUMENTS

CN    1993546 A    7/2004
CN    1594868 A    3/2005
(Continued)

OTHER PUBLICATIONS

International Search Report, PCT International Application No. PCT/EP2011/069419, dated Dec. 28, 2011.

*Primary Examiner* — Grant Moubry
*Assistant Examiner* — Michael A Kessler
(74) *Attorney, Agent, or Firm* — Norton Rose Fulbright US LLP; Gerard Messina

(57) ABSTRACT

An injector system which is in particular used as an injector block for fuel injection systems of mixture-compressing, spark-ignited internal combustion engines includes a fuel distribution rail, a counter bracket, a first injector, and at least one second injector. Here, the counter bracket has a first connecting piece and a second connecting piece. The first injector is joined to the counter bracket on an input side of the first connecting piece with the aid of an elastic sealing ring. The second injector is joined to the counter bracket on an input side of the second connecting piece with the aid of an elastic sealing ring. In this case, the counter bracket is connected to the fuel distribution rail. The fuel distribution rail is used for distributing compressed natural gas to the injectors. The injector system has a compact design.

16 Claims, 4 Drawing Sheets

(51) Int. Cl.
*F02M 55/02* (2006.01)
*F02M 61/14* (2006.01)
*F02D 19/02* (2006.01)

(52) U.S. Cl.
CPC ...... *F02M 21/0281* (2013.01); *F02M 55/025* (2013.01); *F02D 19/027* (2013.01); *F02M 21/0215* (2013.01); *F02M 61/14* (2013.01); *Y02T 10/32* (2013.01)

(58) Field of Classification Search
CPC .... F02M 21/02; F02M 21/0218; F02M 55/02; F02M 55/005; F02M 61/14; F02M 63/0225; F02M 63/0265
USPC ....... 123/299, 304, 445, 447, 456, 468, 469, 123/470, 525–527, 27 GE, 575; 137/507; 239/533.2–533.12
See application file for complete search history.

(56) References Cited

U.S. PATENT DOCUMENTS

| | | | | |
|---|---|---|---|---|
| 5,094,217 | A * | 3/1992 | Kaku | F01P 1/10 123/198 E |
| 5,123,399 | A * | 6/1992 | Motoyama | F02M 61/14 123/469 |
| 5,353,767 | A * | 10/1994 | Carbone | F02M 35/10052 123/184.47 |
| 5,398,656 | A * | 3/1995 | Brisbane | F02M 35/10052 123/456 |
| 5,592,924 | A * | 1/1997 | Audisio | F02B 69/04 123/525 |
| 5,595,160 | A * | 1/1997 | Matsumoto | F02M 69/465 123/456 |
| 5,666,926 | A * | 9/1997 | Ferrera | F02B 43/00 123/525 |
| 5,680,845 | A * | 10/1997 | Peng | F02M 61/145 123/470 |
| 5,682,857 | A * | 11/1997 | Briggs | F02M 69/465 123/456 |
| 5,870,995 | A * | 2/1999 | Stockner | F02M 61/14 123/456 |
| 6,505,612 | B1 * | 1/2003 | Cipressi | F02B 43/00 123/527 |
| 6,588,406 | B2 * | 7/2003 | Oprea | F02D 19/0647 123/304 |
| 6,905,002 | B2 * | 6/2005 | Bagga | F02M 55/04 123/456 |
| 6,959,695 | B2 * | 11/2005 | Warner | F02M 69/465 123/456 |
| 7,556,022 | B1 | 7/2009 | Doherty et al. | |
| 8,297,257 | B2 | 10/2012 | Sugiyama et al. | |
| 2005/0045155 | A1 * | 3/2005 | Harvey | F02M 35/10085 123/470 |
| 2008/0156299 | A1 * | 7/2008 | Sebastian | F02M 69/465 123/470 |
| 2009/0188470 | A1 * | 7/2009 | Rettig | F02M 61/14 123/470 |

FOREIGN PATENT DOCUMENTS

| | | | |
|---|---|---|---|
| CN | 1692222 A | 11/2005 | |
| CN | 201347829 Y | 11/2009 | |
| CN | 201486711 U | 5/2010 | |
| DE | 10 2009 001 866 | 10/2009 | |
| EP | 1 550 805 | 7/2005 | |
| EP | 1726820 A1 | 11/2006 | |
| FR | 2 935 028 | 2/2010 | |
| GB | 875438 A * | 8/1961 | ............ F02M 61/14 |
| GB | 2027488 A * | 2/1980 | ............ F02M 51/02 |
| GB | 2138887 A * | 10/1984 | ........... F02M 61/145 |
| JP | 2005146914 A | 6/2005 | |
| WO | WO 2010/049966 | 5/2010 | |

\* cited by examiner

INJECTOR SYSTEM

FIELD

The present invention relates to an injector system, in particular an injector block, for fuel injection systems of mixture-compressing, spark-ignited internal combustion engines. Here, the injector system relates, in particular, to the distribution of natural gas for the internal combustion engine.

BACKGROUND INFORMATION

To supply natural gas, in particular compressed natural gas (CNG), systems are necessary which are adapted to the particular motor vehicle and in which appropriate openings for the installation of valves or fastening points for the holders of a fuel distribution rail are necessary on the corresponding intake module, for example. Thus, a vehicle-specific adaptation is necessary. Cost-effective retrofit kits for motor vehicles, which are driven by gasoline and which retrofit these for a CNG operation, mostly fall short of the quality which is particularly necessary for emerging countries.

SUMMARY

An example injector system according to the present invention may have the advantage that a compact design having a wide range of applications is possible. In particular, a compact and universal approach for the initial installation and retrofitting may be provided which is cost-effective and of high quality at the same time.

A fuel distribution rail is preferably used for distributing natural gas to the injectors. Therefore, the injector system is, in particular, suited for natural gas in order to enable a mixed operation of a mixture-compressing, spark-ignited internal combustion engine using gasoline and natural gas. The natural gas is in this case preferably stored as compressed natural gas in a gas storage, e.g., at pressures of approximately 20 MPa (200 bar). Such a compressed natural gas is also referred to as CNG. The term natural gas is, however, not limited to the natural gas, but is to be understood in general. For example, the natural gas may also be obtained artificially by coal gasification. Thus, the term natural gas is also understood to mean fuels which are similar to natural gas.

It may be advantageous if the connecting pieces each have hose nipples on their output sides. They may thus be connected to an intake manifold of the internal combustion engine via appropriate hose connections. This makes a great flexibility possible. In particular, an adaptation to differently designed internal combustion engines is possible. The injector system may also be adapted to differently designed internal combustion engines, e.g., to both an in-line engine and an opposed-cylinder engine.

It may also be advantageous if the counter bracket having the connecting pieces is formed from a plastic-based plastic part. In this way, the connecting pieces may be formed together with the counter bracket, in particular as an integrated injection-molded plastic part. However, it may also be advantageous if the counter bracket and the connecting pieces are formed from at least one metallic material and that the connecting pieces are connected to the counter bracket in a form-locked or force-fitted manner. For example, the counter bracket and the connecting pieces may be made of steel or aluminum. The connection of the connecting pieces to the counter bracket may be formed with the aid of screw, solder, or welded connections.

Moreover, it may be advantageous if the injectors are each joined to the counter bracket with the aid of at least one sealing ring and that the sealing rings are designed as elastic sealing rings. It is furthermore advantageous if the injectors are clamped between the counter bracket and the fuel distribution rail and/or are mounted in a floating manner with regard to the counter bracket. With the aid of the elastic sealing rings, it is thus possible to achieve a floating fit of the injectors with regard to the counter bracket. For example, the sealing rings may each be formed from an elastomer. In this way, a direct contact of the injectors with the counter bracket is avoided, thus preventing a possible oscillation transmission, which may cause increased wear, into the injectors.

Moreover, it may be advantageous if the counter bracket is connected to the fuel distribution rail by separate connecting elements. It is also possible that at least one connecting element is advantageously implemented on the counter bracket and that the connecting element of the counter bracket is connected to the fuel distribution rail. In this way, the injector system may be designed as a compact unit in which the individual components are reliably connected and positioned relative to one another. In this way, the installation of the entire injector system is also facilitated. In addition, a retrofitting of the injector system to a gasoline-operated internal combustion engine may also be considerably facilitated. Here, it is advantageous that injector cups, into each of which one injector is inserted, are provided on the fuel distribution rail. The injectors may be connected in this case to the associated injector cups via connecting clamps.

It may also be advantageous if the fuel distribution rail is designed at least generally as an aluminum extrusion profile. It is furthermore advantageous if the fuel distribution rail is at least generally formed from a stainless steel part, in particular a soldered stainless steel part. In this way, the design of a fuel distribution rail is possible which is sufficiently rigid, resistant to the pressure of the natural gas, and may additionally be manufactured in a cost-effective manner.

The design of the injector system may have two or more injectors, the counter bracket including a corresponding number of connecting pieces. In this way, a suitable design of the injector system may be selected with regard to the particular application, in particular with regard to the number of cylinders of the internal combustion engine.

Thus, a compact and universally applicable injector application may be provided. Here, a robust and high quality design is possible. It may, in particular, be substantially more robust and of higher quality than customary retrofit kits. Here, a simple installation on an intake module or in the engine compartment may be enabled. It is also possible that a standard is achieved which enables a certification pursuant to ECE R110 or a comparable standard.

BRIEF DESCRIPTION OF THE DRAWINGS

Preferred exemplary embodiments of the present invention are explained in greater detail in the description below based on the figures in which corresponding elements are provided with matching reference numerals.

DETAILED DESCRIPTION OF EXAMPLE EMBODIMENTS

Figure 1:
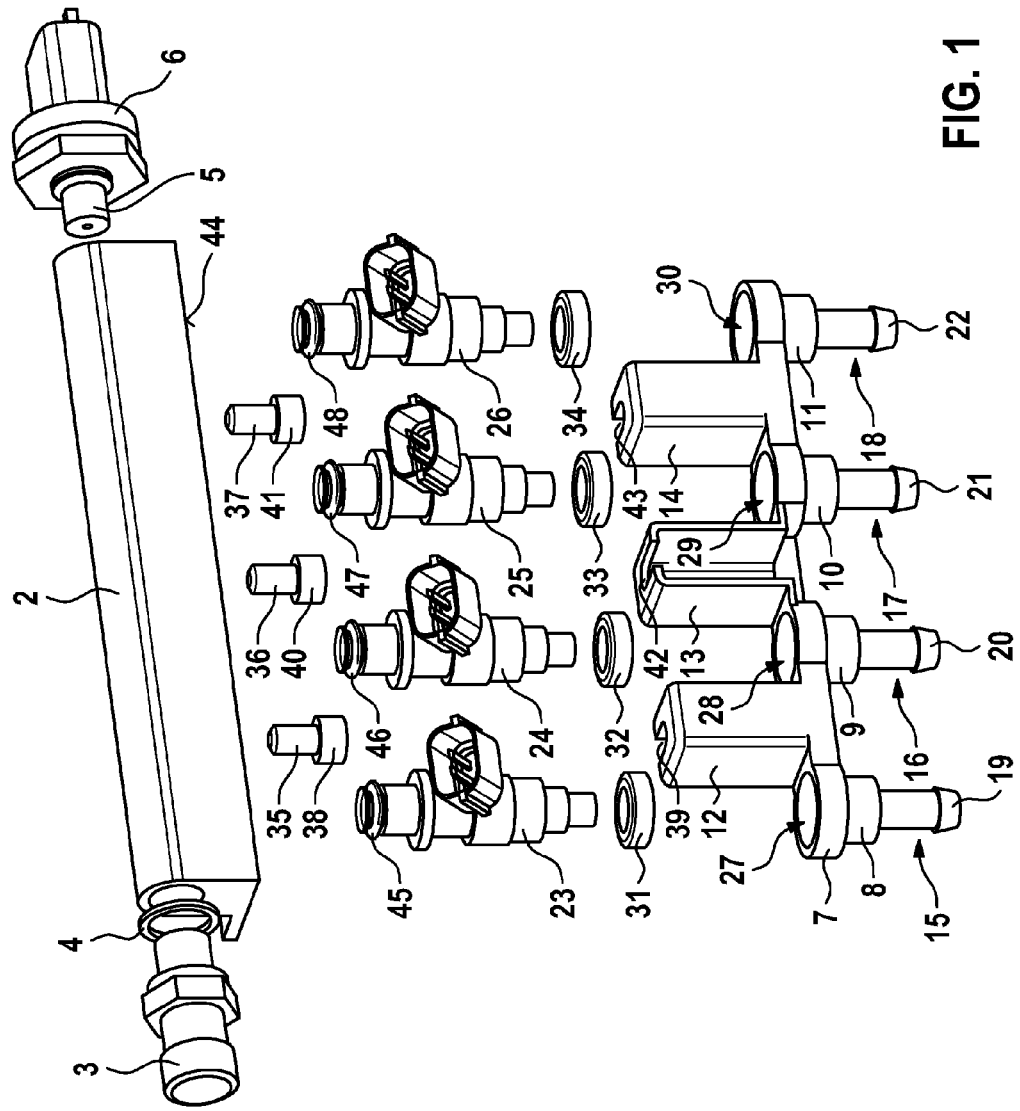
FIG. 1 shows an injector system in a spatial exploded view according to one first exemplary embodiment of the present invention.

FIG. 1 shows an injector system 1 in a spatial exploded view according to one first exemplary embodiment. Injector system 1 may, in particular, be used as injector block 1 for fuel injection systems of mixture-compressing, spark-ignited internal combustion engines. Injector system 1 has a fuel distribution rail 2 which may be made of a metallic material, in particular aluminum. In particular, fuel distribution rail 2 may be designed as an extrusion profile. A connecting piece 3 is installed on fuel distribution rail 2. Here, a sealing ring 4 is provided which is situated between connecting piece 3 and fuel distribution rail 2. A fuel tank may, for example, be connected to connecting piece 3 via a piping. The fuel tank may, in this case, be used for storing natural gas, in particular compressed natural gas (CNG). Compressed natural gas is then conducted to fuel distribution rail 2 via connecting piece 3. Furthermore, a sensor 5 is installed on fuel distribution rail 2, a connecting element, which is connected to sensor 5, enabling a connection to a control unit. Sensor 5 may, for example, be used for measuring the pressure and the temperature of the natural gas in fuel distribution rail 2.

Injector system 1 also has a counter bracket 7 which includes connecting pieces 8, 9, 10, 11. Furthermore, connecting elements 12, 13, 14 are implemented on counter bracket 7. In this exemplary embodiment, counter bracket 7 having connecting pieces 8 through 11 and connecting elements 12 through 14 is formed in one piece from a plastic-based plastic part. In this way, a cost-effective manufacture of the entire counter bracket 7 having connecting pieces 8 through 11 and connecting elements 12 through 14 is possible.

Connecting pieces 8 through 11 each have a hose nipple 19, 20, 21, 22 on their output sides 15, 16, 17, 18. A hose may be connected to each of hose nipples 19 through 22 to, for example, connect injector system 1 to intake manifolds for the individual cylinders of the internal combustion engine.

In this exemplary embodiment, injector system 1 has four injectors 23, 24, 25, 26. First injector 23 is joined to counter bracket 7 on an input side 27 of first connecting piece 8. Accordingly, second injector 24 and the other injectors 25, 26 are joined to counter bracket 7 on input sides 28, 29, 30 of connecting pieces 9 through 11. Here, elastic sealing rings 31, 32, 33, 34 are provided with the aid of which injectors 23 through 26 are joined to counter bracket 7. Elastic sealing rings 31 through 34 enclose each of injectors 23 through 26 at their injection-side end. Elastic sealing rings 31 through 34 may be formed from an elastomer. A floating fit of injectors 23 through 26 is ensured by elastic sealing rings 31 through 34. Due to the floating fit, a direct contact of injectors 23 through 26 with counter bracket 7 is prevented so that a possible oscillation transmission into injectors 23 through 26 is prevented. Such a possible oscillation transmission may result in increased wear which may thus be avoided.

Injector system 1 also has fastening elements 35, 36, 37 which are implemented as screws 35 through 37, in particular cylinder head bolts 35 through 37, in this exemplary embodiment. Screw 35 has a collar 38 which engages with an opening 39 of connecting element 12 when installed. Screw 35 is screwed into fuel distribution rail 3. Accordingly, screws 36, 37 have collars 40, 41 which engage with openings 42, 43 of connecting elements 13, 14. In this exemplary embodiment, connecting elements 12 through 14 rest against a bottom side 44 of fuel distribution rail 2 when installed. When installed, injectors 23 through 26 are thus clamped between counter bracket 7 and fuel distribution rail 2 and are mounted in a floating manner with regard to counter bracket 7. In addition, injectors 23 through 26 are each enclosed on their ends facing fuel distribution rail 2 by elastic sealing rings 45, 46, 47, 48 which ensure a seal between injectors 23 through 26 and the fuel distribution rail. Sealing rings 45 through 48 may be made of an elastomer.

The result is a compact injector system when installed. This compact design facilitates further assembly, which may take place during an initial installation as well as during retrofitting. In this case, a wide range of applications results, since flexible adaptation to the particular internal combustion engine is possible due to the hoses connectable via hose nipples 19 through 22. Moreover, the constructive basic principle may also be maintained when adapting injector system 1 to another number of cylinders and some components may be installed unchanged in the case of a different number of cylinders. An adaptation may take place, for example, by adapting fuel distribution rail 2 and counter bracket 7.

Figure 2:
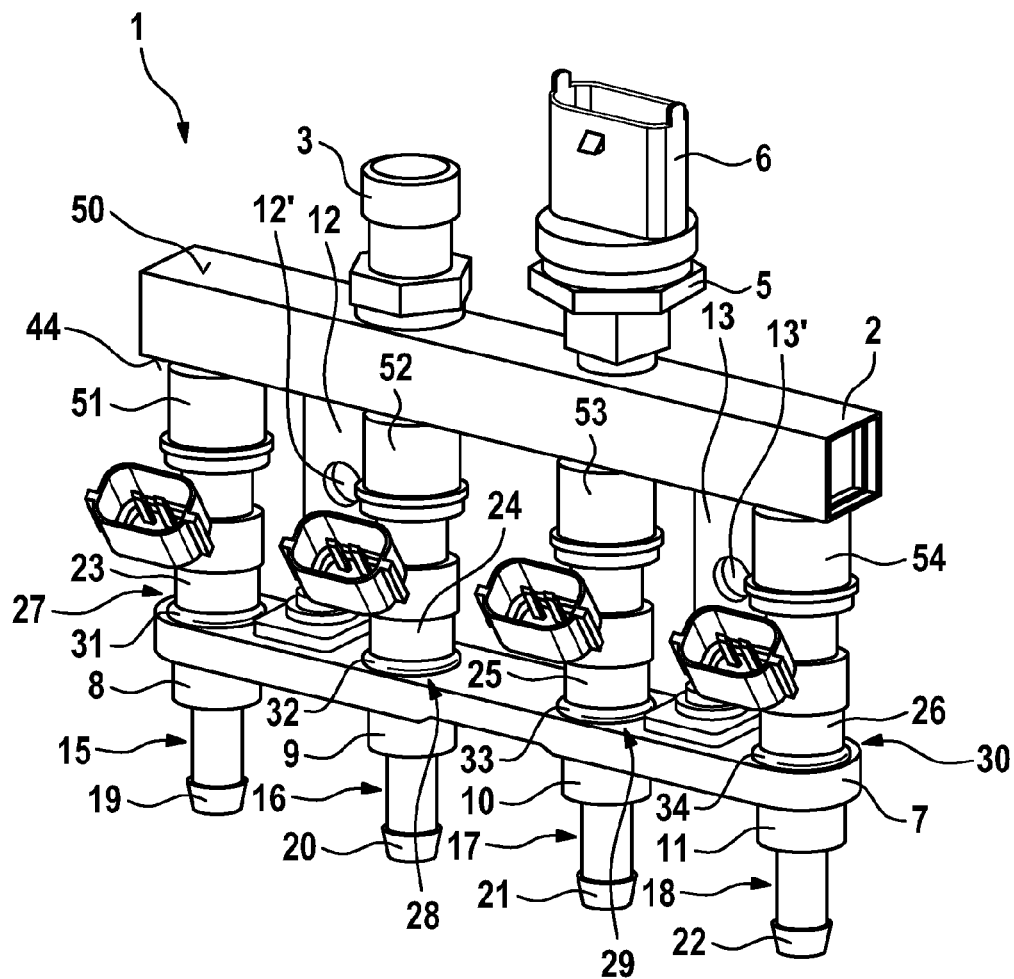
FIG. 2 shows an injector system in a spatial illustration according to one second exemplary embodiment of the present invention.

FIG. 2 shows an injector system 1 in a spatial illustration according to one second exemplary embodiment. In this exemplary embodiment, counter bracket 7 having connecting pieces 8 through 11 is designed as a plastic part. Counter bracket 7 is in this case connected to fuel distribution rail 2 with the aid of separate connecting elements 12, 13. On the one hand, separate connecting elements 12, 13 are suitably connected to fuel distribution rail 2 and, on the other hand, they are suitably connected to counter bracket 7. The implementation of the particular connections may, for example, take place with the aid of fastening elements, in particular screws, in particular cylinder head bolts, by soldering, welding, or in another way.

In this exemplary embodiment, fuel distribution rail 2 is made of a metal, in particular stainless steel. Here, fuel distribution rail 2 is preferably formed by a soldered stainless steel part 2.

Bottom side 44 of fuel distribution rail 2 faces counter bracket 7. In this exemplary embodiment, connecting piece 3 and sensor 5 having connecting element 6 are situated on a top side 50 which faces away from bottom side 44 and which is flat. Connecting piece 3 and sensor 5 having connecting element 6 may also be positioned on top side 50 in a different manner, if necessary.

In this exemplary embodiment, injector cups 51, 52, 53, 54, into each of which one of injectors 23 through 26 is inserted with is inflow-side end, are provided on fuel distribution rail 2. Due to the connection of counter bracket 7 to fuel distribution rail 2, injectors 23 through 26 are reliably clamped between counter bracket 7 and fuel distribution rail 2.

Figure 3:
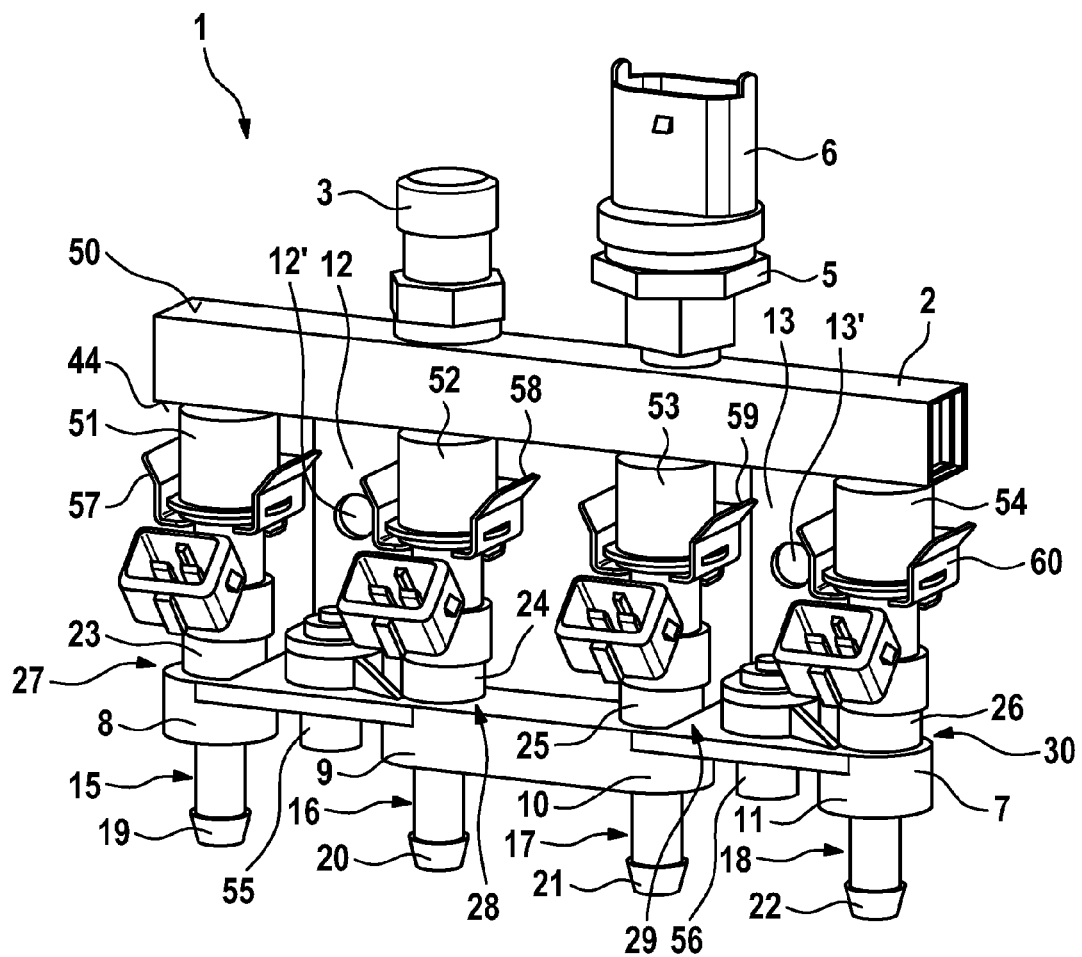
FIG. 3 shows an injector system in a spatial illustration according to one third exemplary embodiment of the present invention.

FIG. 3 shows an injector system 1 in a spatial illustration according to one third exemplary embodiment. In this exemplary embodiment, fastening bolts 55, 56 on which connecting elements 12, 13 may be fastened are attached to counter bracket 7. Fastening bolts 55, 56 may also be extrusion-coated by the plastic material of counter bracket 7. In this way, a form-locked connection is possible between connecting bolts 55, 56 and counter bracket 7. Furthermore, it is possible that fastening bolt 55 is designed in one piece with connecting element 12. Accordingly, it is also possible that fastening bolt 56 is designed in one piece with connecting element 13. Connecting elements 12, 13 have bore holes 12', 13' which make a fastening of injector system 1 in the engine compartment of a vehicle or the like possible.

In addition, connecting clamps 57, 58, 59, 60 are provided in this exemplary embodiment which connect injectors 23 through 26 to injector cups 51 through 54. In this way, injectors 23 through 26 are being held on fuel distribution rail 2.

Figure 4:
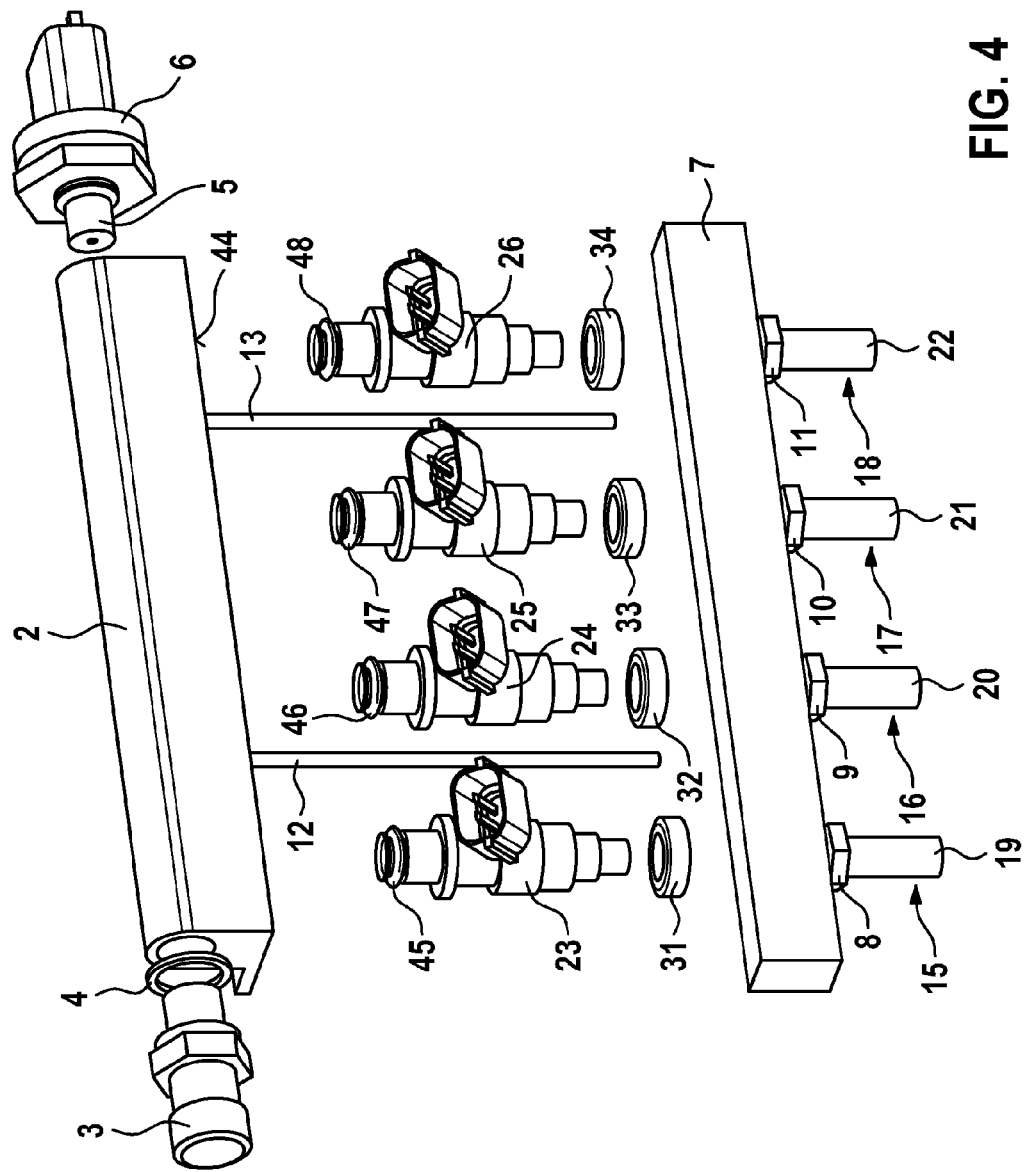
FIG. 4 shows an injector system in a spatial exploded view according to one fourth exemplary embodiment of the present invention.

FIG. 4 shows an injector system 1 in a spatial exploded view according to one fourth exemplary embodiment. In this exemplary embodiment, connecting elements 12, 13, which connect counter bracket 7 to fuel distribution rail 2, are designed as spacer sleeves 12, 13. Here, connecting elements 12, 13 are screwed or soldered to fuel distribution rail 2. In addition, counter bracket 7 is made of a metallic material. Connecting elements 12, 13 are screwed or soldered to counter bracket 7. Counter bracket 7 may be formed from steel or aluminum, for example. Here, counter bracket 7 may have a square, round, or a similar shape. Connecting pieces 8 through 11 having hose nipples 19 through 22 are made of a metallic material in this exemplary embodiment. Here, connecting pieces 8 through 11 are connected to counter bracket 7 with the aid of a screw, solder, or welded connection. Thus, connecting pieces 8 through 11 are connected to counter bracket 7 in a form-locked or force-fitted manner.

The present invention is not limited to the described exemplary embodiments.

What is claimed is:

1. An injector system for a fuel injection system of a mixture-compressing, spark-ignited internal combustion engine, comprising:
    a fuel distribution rail;
    a counter bracket having a first connecting piece and at least one second connecting piece, wherein the counter bracket is connected to the fuel distribution rail by separate connecting elements;
    a first injector joined at least indirectly to the counter bracket on an input side of the first connecting piece; and
    at least one second injector joined at least indirectly to the counter bracket on an input side of the second connecting piece;
    wherein the fuel distribution rail is to distribute fuel through a bottom side of the fuel distribution rail to the first injector and the at least one second injector,
    wherein the first connecting piece and the second connecting piece each have one hose nipple on an output side,
    wherein the injector system is provided to guide the fuel from the fuel distribution rail through the bottom side of the fuel distribution rail, through the first injector and through the first connecting piece of the counter bracket to the hose nipple of the first connecting piece,
    wherein the injector system is provided to guide the fuel from the fuel distribution rail through the bottom side of the fuel distribution rail, through the second injector and through the second connecting piece of the counter bracket to the hose nipple of the second connecting piece,
    wherein the bottom side of the fuel distribution rail faces the counter bracket, and
    wherein the first injector and the second injector are each are at least one of: (i) clamped between the counter bracket and the fuel distribution rail, and (ii) mounted in a floating manner with respect to the counter bracket.

2. The injector system as recited in claim 1, wherein the fuel distribution rail is to distribute natural gas to the injectors.

3. The injector system as recited in claim 1, wherein the counter bracket is a plastic-based plastic part.

4. The injector system as recited in claim 1, wherein the counter bracket and the first connecting piece and the second connecting piece are made of at least one metallic material and the first connecting piece and the second connecting piece are connected to the counter bracket in at least one of a form-locked and force-fitted manner.

5. The injector system as recited in claim 1, wherein the first injector and the at least one second injector are each joined to the counter bracket with the aid of at least one elastic sealing.

6. The injector system as recited in claim 1, wherein the counter bracket is connected to the fuel distribution rail by separate connecting elements.

7. The injector system as recited in claim 1, wherein at least one connecting element is implemented on the counter bracket and the connecting element of the counter bracket is connected to the fuel distribution rail.

8. The injector system as recited in claim 1, wherein injector cups, into each of which one injector is inserted, are provided on the fuel distribution rail.

9. The injector system as recited in claim 8, wherein the injectors are each connected to an associated one of the injector cups via a connecting clamp.

10. The injector system as recited in claim 1, wherein the fuel distribution rail includes an aluminum extrusion profile.

11. The injector system as recited in claim 1, wherein the fuel distribution rail is formed from a soldered stainless steel part.

12. The injector system as recited in claim 1, wherein the fuel distribution rail is to distribute natural gas to the injectors, wherein the first connecting piece and the second connecting piece each have one hose nipple on an output side.

13. The injector system as recited in claim 12, wherein the counter bracket is a plastic-based plastic part.

14. The injector system as recited in claim 12, wherein the counter bracket and the first connecting piece and the second connecting piece are made of at least one metallic material and the first connecting piece and the second connecting piece are connected to the counter bracket in at least one of a form-locked and force-fitted manner.

15. The injector system as recited in claim 12, wherein the first injector and the at least one second injector are each joined to the counter bracket with the aid of at least one elastic sealing.

16. The injector system as recited in claim 1, wherein the fuel distribution rail includes an aluminum extrusion profile, or wherein the fuel distribution rail is formed from a soldered stainless steel part.

* * * * *